Figure 1:
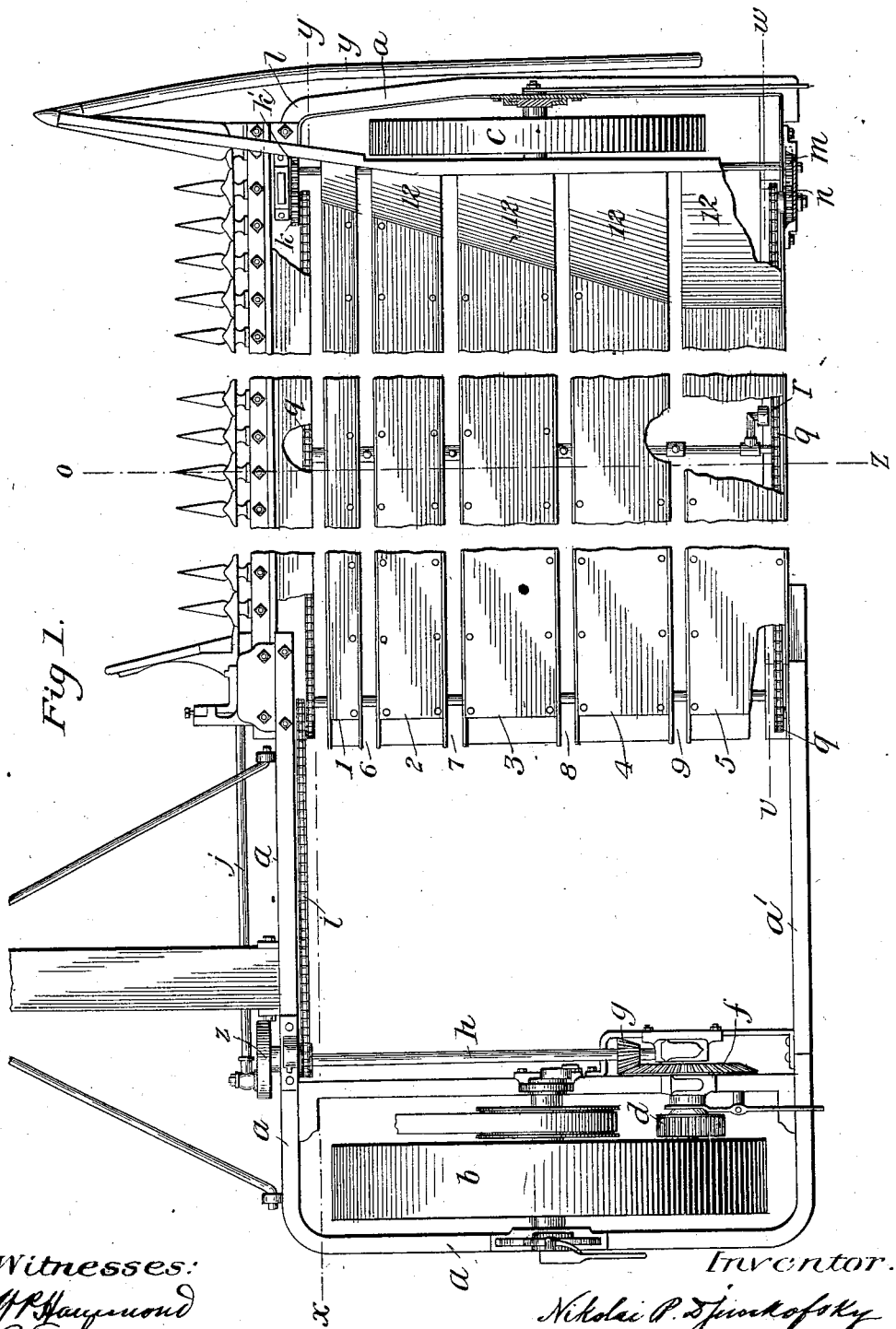

No. 725,943. PATENTED APR. 21, 1903.
N. P. DJUNKOFSKY.
HARVESTING MACHINE.
APPLICATION FILED NOV. 29, 1901.
NO MODEL. 3 SHEETS—SHEET 1.

Witnesses: Inventor:
Nikolai P. Djunkofsky
By Knight Bros
Attorneys

No. 725,943. PATENTED APR. 21, 1903.
N. P. DJUNKOFSKY.
HARVESTING MACHINE.
APPLICATION FILED NOV. 29, 1901.
NO MODEL. 3 SHEETS—SHEET 2.
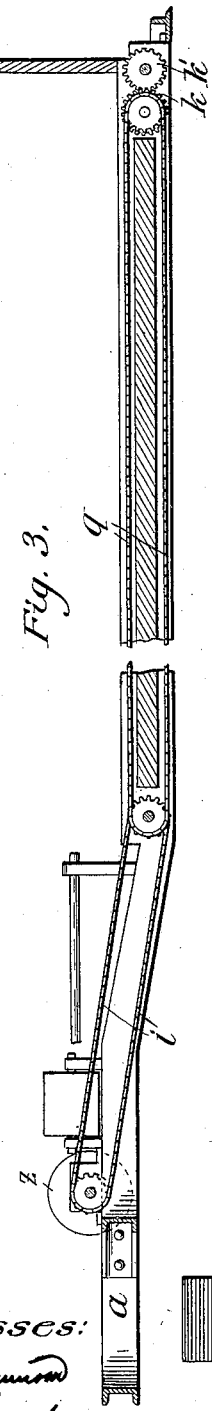
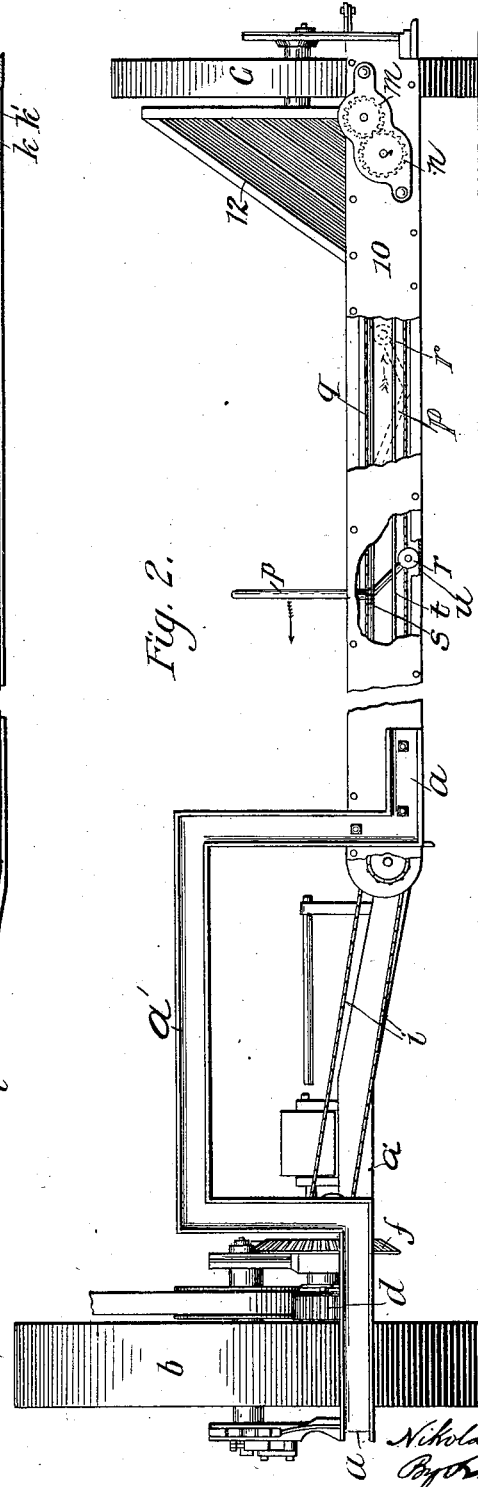
Witnesses: Inventor:
Nikolai P. Djunkofsky

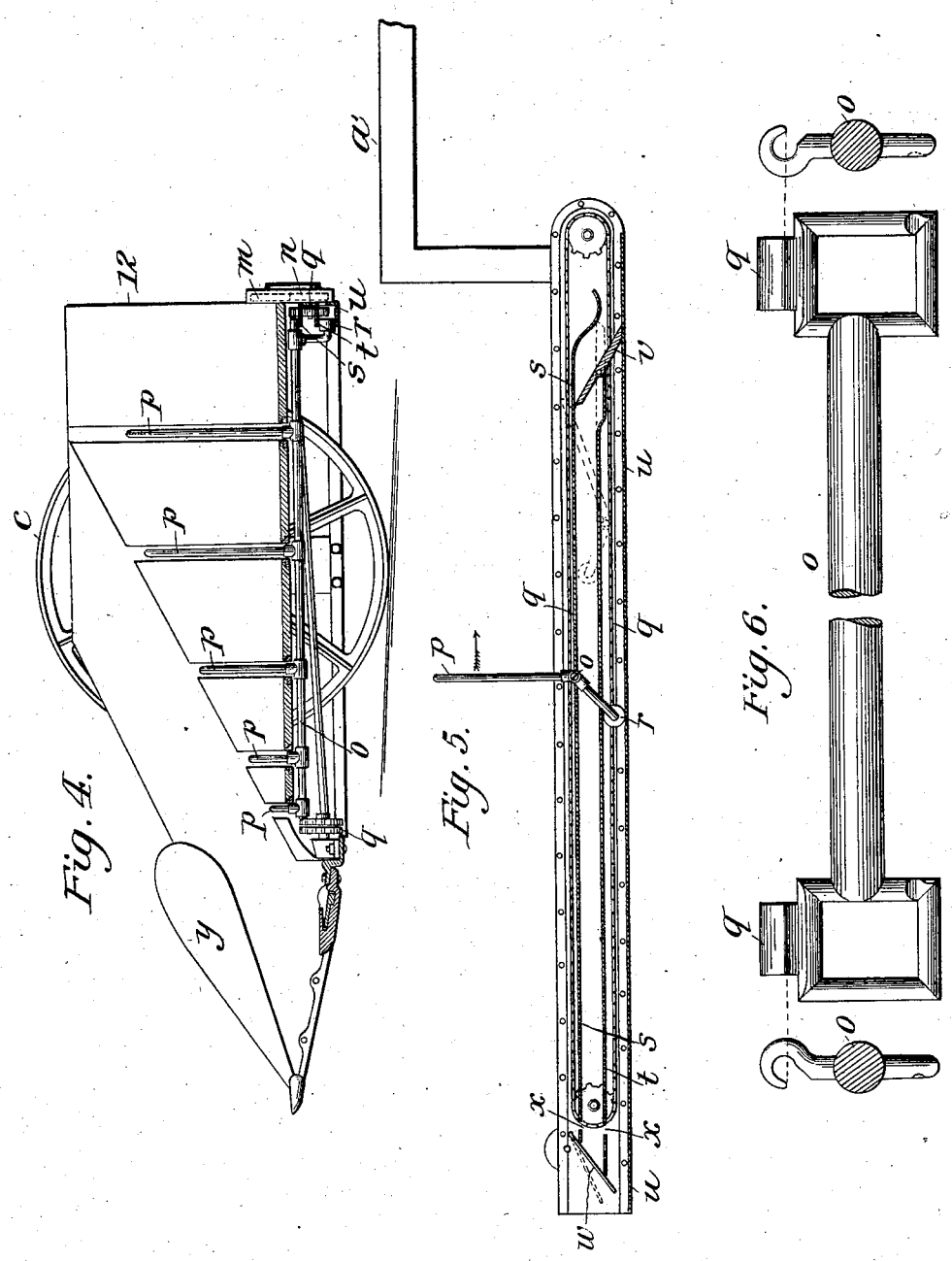

UNITED STATES PATENT OFFICE.

NIKOLAI PETROWITSCH DJUNKOFSKY, OF CHARKOFF, RUSSIA.

HARVESTING-MACHINE.

SPECIFICATION forming part of Letters Patent No. 725,943, dated April 21, 1903.

Application filed November 29, 1901. Serial No. 84,132. (No model.)

*To all whom it may concern:*

Be it known that I, NICOLAI PETROWITSCH DJUNKOFSKY, a subject of the Emperor of Russia, residing at Michaelstrasse 3, Charkoff, Russia, have invented certain new and useful Improvements in Harvesting-Machines, of which the following is a specification.

My present invention relates to a harvesting-machine in which the cutters work in the usual manner and throw the grain, grass, or other growth upon a platform. The platform is divided into several compartments by slots, through which project the separate prongs of a rake connected with endless continuously-rotating chains. When the cut grain or the like advanced by the rake arrives at the end of the platform, it is thrown off, and the rake is then turned down into a horizontal or nearly-horizontal position by a suitable device and moved back to its first position. By continuously repeating this movement the cut grain, grass, or such like is thrown off in quantities suitable for forming sheaves.

In the accompanying drawings, illustrating my invention, Figure 1 is a plan of the machine. Fig. 2 is a back elevation. Fig. 3 is a section on the line $x\,y$ of Fig. 1; Fig. 4, a section on the line $o\,z$ of Fig. 1; Fig. 5, a section on the line $v\,w$ of Fig. 1; and Fig. 6 a full-size elevation of one of the chain-links carrying the rakes.

The frame $a$ of the machine extends around the wheels and has on its rear side an upwardly-bent portion $a'$ between the platform and the driving-wheel $b$, as shown in Fig. 2. A square open space is provided between the platform and the driving-wheel for the discharge of the successive bunches of cut grain raked from the platform, the elevation of the portion $a'$ of the rear side of the frame to a considerable height above the level of the platform, as shown in Fig. 2, permitting the rear of the frame to pass freely over the discharged bunches of cut grain. The pinion $d$ is mounted to slide on its shaft in customary manner, so as to engage with an internally-toothed wheel (not shown) within the wheel $b$, the said pinion being moved in and out of gear by means of a hand-lever $e$. When in gear, the toothed wheel $d$ drives, through the medium of the bevel-gearing $f\,g$, a shaft $h$, carrying a crank-disk $z$, to which is jointed a connecting-rod $j$, by which the cutters are actuated in the usual manner. The cut grain falls on the platform, composed of the parts 1, 2, 3, 4, and 5, separated from each other by the slots 6, 7, 8, and 9. From the shaft $h$ is likewise driven a chain $i$, by which through the medium of suitable chain-wheels the two endless chains $q$ are driven. One of the chains $q$ drives the wheels $k\,k'$, Figs. 1 and 3, and the rotation of the wheel $k'$ is transmitted by a shaft and the wheels $m\,n$ to the second chain $q$. To the chain $q$ is secured the shaft $o$, Figs. 5 and 6, which consequently moves with the chains. The rake is pivoted on the shaft $o$, and the prongs $p$ of this rake project through the slots 6, 7, 8, and 9 of the platform. At the lower end or back of the rake is provided a roller $r$, mounted on a rigid arm, and underneath the platform there are three rails $s\,t\,u$, Fig. 5, which guide the roller $r$, and thus determine the position of the rake when the chains rotate in the direction of the arrows, Figs. 2 and 5. When the chain-links to which the rod $o$ is secured are in the position shown in full lines in Fig. 5, the prongs $p$ of the rake are perpendicular and move the grain or the like along the platform. On arriving at the end of the platform the shaft to which the rake is pivoted descends, while the roller $r$ runs up the flap $v$ onto the middle guide $t$ and keeps the rake in the nearly-horizontal position (shown in dotted lines) until it arrives at the other end of the platform, where the spring-flap $w$ presses the roller $r$ down onto the bottom guide $u$, the rake-shaft being raised again by the chain $q$. The flap $v$ is kept in its normal position by gravity. In the rails $s$ and $t$ are provided openings $x$, through which the rod $o$ can pass, but not the roller $r$. By this means the prongs of the rake are moved instantaneously into a vertical position as soon as the chains arrive at the corresponding point in their rotation.

Projecting upward from the platform, adjacent to the wheel $c$, is an inclined hood 12, behind which the prongs of the rake take their vertical position, and having vertical slots through which the erect prongs pass out. On the same side of the platform is likewise provided the converging divider *y* to press aside the uncut grain or the like in working the machine.

What I claim, and desire to secure by Letters Patent of the United States, is—

In a harvesting-machine, the combination of a platform to receive the cut grain or the like; chains adapted to be driven by the movement of the machine; a shaft secured to said chains, projecting prongs carried by said shaft constituting a rake; a roller mounted on a rigid arm connected with said rake; rails adapted to guide said roller; an inclined hinged flap at one end of said platform adapted to guide said roller from one rail to the other; and a spring-flap at the opposite end of said platform adapted to press said roller from one rail to the other; substantially as and for the purpose set forth.

In testimony whereof I have hereunto set my hand in the presence of two witnesses.

NICOLAI PETROW. DJUNKOFSKY.

Witnesses:
H. A. LOVIAGUINE,
E. W. LOURE.